United States Patent Office 3,551,559
Patented Dec. 29, 1970

3,551,559
PROCESS FOR PRODUCING DEAERATED TOOTHPASTE
John J. Miles, Woodcliff Lake, N.J., assignor to Lever Brothers Company, New York, N.Y., a corporation of Maine
No Drawing. Filed July 16, 1968, Ser. No. 745,127
Int. Cl. A61k 7/16
U.S. Cl. 424—49                                            7 Claims

ABSTRACT OF THE DISCLOSURE

An improvement in the process for deaerating toothpaste having entrained air therein which improvement comprises incorporating a highly volatile material into the toothpaste prior to the deaeration thereof.

---

The present invention relates to an improved process for the production of deaerated toothpaste.

Toothpaste is produced by blending together the various components thereof in a series of mixing devices. When the mixing devices are vacuum mixers, air does not become entrained into the toothpaste so that the toothpaste need not be deaerated to remove any entrained air. However, such vacuum mixing equipment and procedure is cumbersome and expensive.

Alternatively, toothpaste is produced by blending the various components thereof together in mixing equipment which is not under vacuum and hence is open to the air. During such mixing, air must be removed in order to control the specific gravity of the toothpaste so that the toothpaste tubes will be filled with the requisite weight content of toothpaste. Moreover, the entrained air must be removed in order to eliminate the air bubbles from the toothpaste and thereby improve the appearance of the toothpaste. Also, in the production of either translucent or transparent toothpastes, it is mandatory that any entrained air be removed therefrom, since the entrained air destroys the translucency or transparency of the toothpastes by imparting opacity thereto. However, such deaeration is time consuming, lowers throughput and generally requires high vacuum therefor.

It is, therefore, an object of the present invention to provide an improved process for the production of toothpaste which need not use cumbersome and expensive vacuum mixing equipment. It is a further object of the invention to provide a process wherein toothpaste having entrained air can be deaerated at a faster rate or in less time and which can use less vacuum during the deaeration step.

In general, the process of the invention comprises the improvement in the production of toothpaste having air entrained therein by deaeration of the toothpaste wherein the improvement involves the incorporation of a highly volatile material as a deaeration aid into the toothpaste prior to the deaeration thereof.

It has been found that by the improved process of the invention the deaeration can take place in a much shorter period of time with resulting greater throughput and using less vacuum for the deaeration. For example, 90 pounds of a silica toothpaste can be deaerated in a 26" bowl Versator in 10 to 15 minutes at a vacuum of 28.5"–29.5" of mercury when the toothpaste does not contain a highly volatile material at the time of deaeration. However, 90 pounds of the same silica toothpaste can be deaerated in the same equipment in only 1 minute at a vacuum of only 27.5"–28.5" of mercury when the toothpaste contains a highly volatile material at the time of deaeration. By the process of the invention the time of deaeration can be decreased about ten-fold and the vacuum requirements can be decreased by about 1" of mercury.

Volatile materials useful in the process of the invention are those which readily volatilize and hence have a relatively high vapor pressure and conversely a relatively low boiling point. The highly volatile materials are liquids and, of course, are non-toxic when ingested. As a general rule, the boiling point of such highly volatile materials is below about 62° C. at atmospheric pressure. Representative examples of suitable highly volatile materials include chloroform, diethyl ether, acetone, petroleum ether, and the like. The preferred highly volatile material is chloroform, since chloroform also serves as a flavoring agent in toothpaste.

The amount of volatile material which is incorporated into the toothpaste containing entrained air prior to deaeration will vary depending upon the physical nature of toothpaste and the volatility of the volatile material. Thus the amount of volatile material which is added to the toothpaste prior to deaeration is a function of the cohesiveness or viscosity of the toothpaste. In this connection, less of the volatile material would be used for the lower viscosity toothpastes and conversely more of the volatile material would be used for the higher viscosity toothpastes.

Although we do not wish to be bound by any theory expressed herein, it is theorized that the amount of volatile material which must be added to the toothpaste for effective deaeration is a function of the volatility of such material. In addition there are factors other than volatility which are believed to have a significant effect upon the rate of deaeration, such as the temperature and vacuum conditions as well as the surface tension of the paste being deaerated, and the solubility of the volatile additive. It is understood that the effect of the above factors may vary according to the specific volatile material being used.

In general, the amount of volatile material added to the toothpaste is a small amount of only at least about 0.5% by weight thereof. More usually, at least about 0.75% by weight of the volatile material is added to the toothpaste prior to deaeration. Preferably, however, the amount of volatile material added to the toothpaste prior to deaeration is at least about 1% based on the weight of the toothpaste. The maximum amount of volatile material incorporated into the toothpaste is not critical to achieve the desired improvement in deaeration and is determined primarily by cost. In view of the fact that some of the volatile material is lost from the toothpaste during the deaeration, the amount used is generally only that sufficient to improve the deaeration of the toothpaste. The maximum amount of volatile material usually would not exceed about 4% by weight of the toothpaste.

The deaeration of the toothpaste can be performed in any conventional deaeration equipment. Such equipment operates on the principle of forming a thin film of the toothpaste and subjecting the toothpaste to a vacuum so as to remove the entrained air therefrom. Exemplary of such film deaeration equipment are the vacuum centrifuges, such as Versator. During deaeration the toothpaste is subjected to a suitable vacuum on the order of about 20" to 29" of mercury. At the higher vacuums, a greater throughput of toothpaste is achieved.

The process of the present invention is applicable to a wide variety of toothpaste compositions and the nature and amount of the components thereof are not important features of the invention. Such conventional opaque, translucent or transparent toothpastes contain, in general, from about 5% to about 70% by weight of abrasive materials which serve as polishing and cleansing ingredients, such as silica, alumina, calcium carbonate, dicalcium phosphate, calcium pyrophosphate, sodium metaphosphate and the like; from about 5% to about 70% by weight of carriers and softeners, such as glycerine, sorbitol, ethyl alcohol, mineral oil, syrup, glucose and invert sugars, glycols, honey, and the like; from about 0.5% to about 30% by weight of binders, typical examples of which include gum tragacanth, sodium carboxymethyl cellulose, hydroxyethyl cellulose, India gum, Irish moss or carragheen and its derivatives, starch, acacia gums, agar agar, locust bean gum, pectin, petrolatum and the like; from about 0.1% to about 5% by weight of flavoring agents, such as peppermint, wintergreen, spearmint, methanol and the like; from about 4% to about 60% by weight of water, from about 0.01% to about 6% by weight of surface tension depressants, such as fatty acid soaps and synthetic organic detergents, for example, sodium lauryl sulfate; from about 0.02% to about 10% by weight of buffers, such as sodium citrate, sodium benzoate, and the like; from about 0.01% to about 2% by weight of preservatives; from about 0.01% to about 2% by weight of therapeutic agents, such as germicides, antibiotics, astringents or fluorine-containing compounds, typical examples of which include tyrothrycin, chlorophyllins, hexachlorophene, the sarcosides, astringent salts and water-soluble ionizable fluorine-containing compounds, such as sodium fluoride, lithium fluoride, stannous fluoride, potassium fluoride, ammonium fluoride, sodium fluostannite, stannous chlorofluoride, sodium monofluophosphate, and the like; humectants; oxygen-releasers, such as perborates; sweeteners, such as saccharin; and harmless colorants.

The process of the invention will be illustrated by the following representative example thereof.

EXAMPLE

The following finished toothpaste is prepared by blending the listed components thereof together in an open system with the chloroform ingredient being present in the toothpaste mix prior to deaeration in an amount of 1.25% by weight of the toothpaste. It will be noted from the following finished formulation that 0.5% by weight of chloroform is lost during deaeration which constitutes a loss of chloroform of about 40%.

TABLE

| Ingredients: | Percent by weight |
|---|---|
| Silica (Syloid 63) | 14.000 |
| Silica (Syloid 244) | 7.500 |
| Sorbitol (70%) | 54.400 |
| Glycerine | 13.583 |
| Sodium carboxymethyl cellulose | 0.600 |
| Saccharin | 0.200 |
| Colorants | 0.536 |
| Sodium benzoate | 0.081 |
| Flavor | 1.250 |
| 3',4,5'-tribromosalicylanilide | 0.050 |
| Hexachlorophene | 0.050 |
| Chloroform | 0.750 |
| Sodium lauryl sulfate-glycerine mixture | 7.000 |
| Total | 100.000 |

The above toothpaste originally containing 1.25% by weight of chloroform is deaerated in a 26" bowl Versator. 90 pounds of the toothpaste are deaerated in 1 minute at a vacuum of 28" of mercury. The toothpaste given above, but free from chloroform, is also deaerated in a 26" bowl Versator. 90 pounds of this comparative chloroform-free toothpaste takes from 10 to 15 minutes to be deaerated at a higher vacuum of 29" of mercury.

The above demonstrates that the process of the invention enables the same amount of a toothpaste to be deaerated in an appreciably shorter period of time, such as ⅒ the time, and at a lower vacuum, such as a vacuum lower by 1.0" of mercury. Moreover, although there is some loss of the volatile material, such as chloroform, during deaeration, this loss, in general, ranges only from about 20% to about 50% and is more than compensated for by the more rapid deaeration and lower vacuum requirements. Since the percent loss of volatile material increases as the amount of volatile material added is increased, the loss in volatile material can be minimized by avoiding use of excessive amounts thereof. It will be appreciated that any volatile material lost during deaeration can be replaced, if desired, in the toothpaste by addition thereto after deaeration whereupon the toothpaste is further processed in a closed system.

Results similar to those set forth above in the example were also obtained using other conventional toothpastes and other highly volatile materials as deaeration aids.

Although highly volatile materials, such as chloroform and the like, have been incorporated into toothpastes heretofore, the prior art has always been careful to prepare such toothpastes in closed systems using vacuum mixers so that no air was entrained in the toothpastes and the volatile material was added to the air-free pastes subsequent to the vacuum mixing. Alternatively, in the prior art, where air has been entrained in the toothpaste, the toothpaste is deaerated and only subsequent thereto are the highly volatile materials added. Thus, the prior art has never utilized nor recognized the unexpectedly valuable property of volatile materials as deaeration aids.

It will be appreciated that various modifications and changes can be made in the process of the invention by those skilled in the art without departing from the essence thereof and that accordingly the process of the invention is to be limited only within the scope of the appended claims.

What is claimed is:

1. In a process for the production of deaerated toothpaste wherein air is entrained in the toothpaste during production and is removed therefrom by deaerating the toothpaste, the improvement which comprises incorporating at least about 0.5% by weight of a highly volatile non-toxic liquid material having a boiling point at atmospheric pressure of below about 62° C. selected from the group consisting of chloroform, diethyl ether, acetone and petroleum ether as a deaeration aid into the toothpaste prior to the deaeration thereof.

2. The process as defined by claim 1 wherein the highly volatile non-toxic liquid material is incorporated into the toothpaste in an amount of at least about 0.75% by weight thereof.

3. The process as defined by claim 1 wherein the highly volatile non-toxic liquid material is incorporated into the toothpaste in an amount of at least about 1% by weight thereof.

4. The process as defined by claim 1 wherein the highly volatile non-toxic liquid material is chloroform.

5. The process as defined by claim 1 wherein the highly volatile non-toxic liquid material is diethyl ether.

6. The process as defined by claim 1 wherein the highly volatile non-toxic liquid material is acetone.

7. The process as defined by claim 1 wherein the highly volatile non-toxic liquid material is petroleum ether.

References Cited

UNITED STATES PATENTS 1,645,792  10/1927  Brownlee  424—51
1,645,793  10/1927  Brownlee  424—51

RICHARD L. HUFF, Primary Examiner